(No Model.)

D. G. SHERIDAN.
SNAP HOOK.

No. 271,372. Patented Jan. 30, 1883.

WITNESSES:
Francis McArdle.
Chas. Lurcott

INVENTOR:
D. G. Sheridan
BY Munn & Co.
ATTORNEYS.

UNITED STATES PATENT OFFICE.

DAVID G. SHERIDAN, OF BRIDGEPORT, CONNECTICUT.

SNAP-HOOK.

SPECIFICATION forming part of Letters Patent No. 271,372, dated January 30, 1883.

Application filed June 15, 1882. (No model.)

*To all whom it may concern:*

Be it known that I, DAVID G. SHERIDAN, of Bridgeport, in the county of Fairfield and State of Connecticut, have invented a new and Improved Snap-Hook, of which the following is full, clear, and exact description.

My invention consists of a snap-pawl for securing the ring or other object, pivoted to the hook near the point, and provided with a spring, also attached to the hook near the point, so as to snap over the ring after entering the hook, the pawl being provided with wing-plates projecting from its edges, so as to embrace the hook for guards to the pawl and spring and for holding the ring or other object more securely, and the pivot-hole for the pawl and the rivet-hole for the spring being located near the point of the hook, where said hook is not exposed to much strain, which is preferable to the ordinary arrangement, in which the rivet-hole for securing spring is where the hook is severely strained, all as hereinafter fully described.

Reference is to be had to the accompanying drawings, forming a part of this specification, in which similar letters of reference indicate corresponding parts in both the figures.

Figure 1:
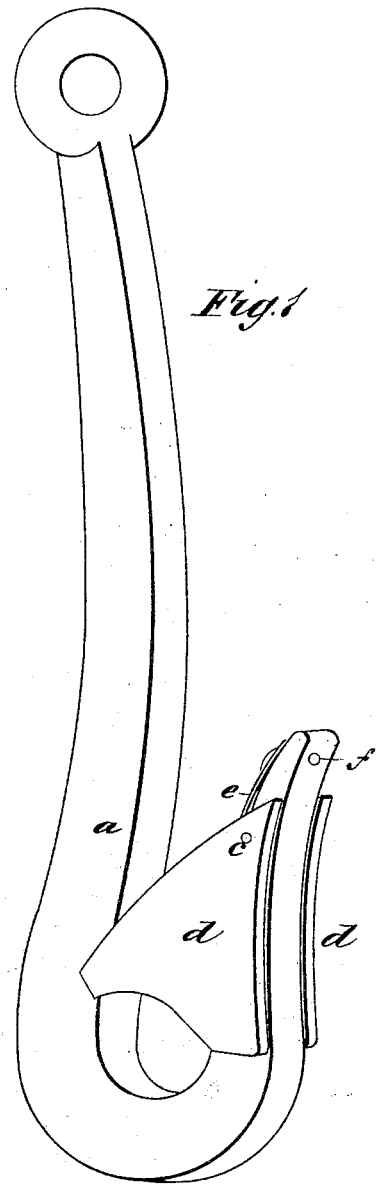
Figure 2:
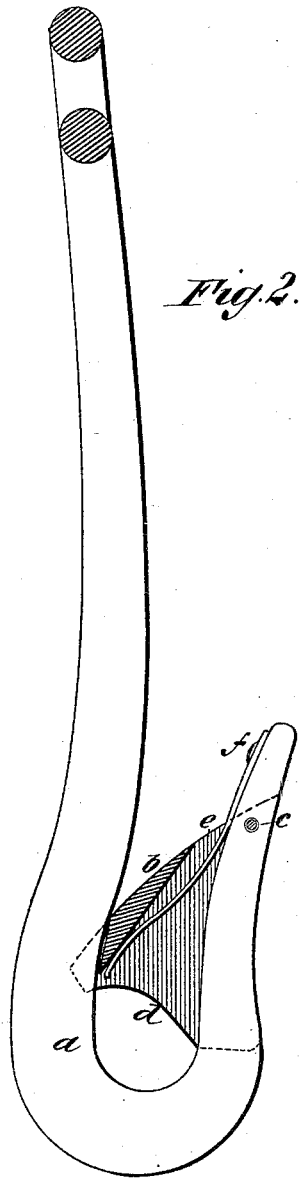

Figure 1 is a perspective view of my improved snap-hook, and Fig. 2 is a sectional elevation.

The hook *a* may be of the ordinary or any approved form to which I propose to pivot a pawl, *b*, at *c*, said pawl having wing-plates or guides *d*, embracing the sides of the hooks, as shown, and being provided with a spring, *e*, said spring being also secured to the hook at *f*, near the point whereby, as above stated, the part of the hook where the spring is commonly attached, and which is subject to the most strain, is preserved intact, instead of being weakened by the hole. The pawl and the spring close against the back of the hook instead of the point, as in the common way. The arrangement of the pawl as I propose is a protection to the spring, preventing injury to it by the ring whether entering or leaving the hook.

Having thus described my invention, I claim as new and desire to secure by Letters Patent—

1. In a snap-hook, the combination, with its beak, of the spring arranged interiorly of its entrance—that is to say, having one end connected to the beak near its outer end, on the inside, and its other end touching, or nearly so, the shank of the hook near its lower end, on the inner side—substantially as shown and described, and for the purpose set forth.

2. In a snap-hook, the combination, with its beak, of the pawl arranged upon the spring and pivoted or hung thereto near its outer end, on the inner side, and adapted to extend across the space between the beak and the shank and to bear against the latter near its lower end, on its inner side, substantially as shown and described, for the purpose specified.

3. The combination of a pawl, *b*, and wing or guard-plates *d*, also a spring, *e*, with a hook, said pawl and spring being attached to the hook near the point, and the guard-plates embracing the sides of the hook near the point, substantially as described.

DAVID G. SHERIDAN.

Witnesses:
SAML. T. HOUGHTON,
WM. M. BEARDSLEY.